United States Patent
Marjadi et al.

(10) Patent No.: US 8,073,780 B2
(45) Date of Patent: Dec. 6, 2011

(54) TOKEN BASED CLUB DIGITAL CONTENT LICENSING METHOD

(75) Inventors: Dhiren Marjadi, Wayland, MA (US); James P. Dagg, Wixom, MI (US); James P. Scapa, West Bloomfield, MI (US)

(73) Assignee: Altair Engineering, Inc., Troy, MI (US)

( * ) Notice: Subject to any disclaimer, the term of this patent is extended or adjusted under 35 U.S.C. 154(b) by 1160 days.

(21) Appl. No.: 11/061,166

(22) Filed: Feb. 21, 2005

(65) Prior Publication Data

US 2005/0182731 A1    Aug. 18, 2005

Related U.S. Application Data

(63) Continuation-in-part of application No. 09/855,317, filed on May 15, 2001, now Pat. No. 7,672,972.

(51) Int. Cl.
   *G06F 15/16*   (2006.01)
(52) U.S. Cl. ............................................ 705/59; 705/52
(58) Field of Classification Search .................. 707/104; 705/1, 9; 710/200
   See application file for complete search history.

(56) References Cited

U.S. PATENT DOCUMENTS

| | | | | |
|---|---|---|---|---|
| 4,937,863 A * | 6/1990 | Robert et al. | | 710/200 |
| 5,204,897 A | 4/1993 | Wyman | | |
| 5,260,999 A | 11/1993 | Wyman | | |
| 5,390,297 A * | 2/1995 | Barber et al. | | 713/201 |
| 5,438,508 A | 8/1995 | Wyman | | |
| 5,579,222 A * | 11/1996 | Bains et al. | | 717/167 |
| 5,606,493 A | 2/1997 | Duscher et al. | | |
| 5,671,412 A * | 9/1997 | Christiano | | 707/104.1 |
| 5,745,879 A * | 4/1998 | Wyman | | 705/1 |
| 5,758,069 A * | 5/1998 | Olsen | | 726/27 |
| 6,009,401 A * | 12/1999 | Horstmann | | 705/1 |
| 6,141,754 A * | 10/2000 | Choy | | 726/1 |
| 6,219,652 B1 | 4/2001 | Carter et al. | | |
| 6,275,844 B1 | 8/2001 | Rail | | |
| 6,411,941 B1 * | 6/2002 | Mullor et al. | | 705/59 |
| 6,502,124 B1 * | 12/2002 | Shimakawa et al. | | 709/203 |
| 6,574,612 B1 * | 6/2003 | Baratti et al. | | 705/59 |
| 6,591,244 B2 * | 7/2003 | Jim et al. | | 705/9 |
| 6,728,766 B2 * | 4/2004 | Cox et al. | | 709/220 |
| 6,732,106 B2 * | 5/2004 | Okamoto et al. | | 707/100 |
| 6,816,882 B1 * | 11/2004 | Conner et al. | | 709/203 |
| 2002/0007298 A1 * | 1/2002 | Jim et al. | | 705/9 |
| 2002/0049679 A1 * | 4/2002 | Russell et al. | | 705/52 |
| 2002/0129356 A1 * | 9/2002 | Hellerstein et al. | | 717/177 |
| 2003/0036683 A1 * | 2/2003 | Kehr et al. | | 600/300 |
| 2003/0069766 A1 * | 4/2003 | Hoffman et al. | | 705/7 |

* cited by examiner

*Primary Examiner* — Evens J Augustin
(74) *Attorney, Agent, or Firm* — Young Basile (57) ABSTRACT

A predetermined number of license units for each of a plurality of individually selectable pieces of digital content in a digital content suite are checked out when each piece of digital content is executed by a customer in a customer club. Execution of a requested digital content is granted when the number of license units to execute the requested digital content is less than or equal to the total number of available units for the club. Access is granted for execution of the requested digital content by a license manager based on whether the required units of the requested digital content are greater than the available units on the requesting customer computer network. If the requested digital content cannot be executed immediately, the required units can be locked up and charged to the customer club available units or left uncharged.

10 Claims, 7 Drawing Sheets

TOKEN BASED CLUB DIGITAL CONTENT LICENSING METHOD

CROSS REFERENCE TO CO-PENDING APPLICATION

This application is a continuation-in-part application of co-pending U.S. application Ser. No. 09/855,317, filed May 15, 2001, now U.S. Pat. No. 7,672,972 and entitled "Digital Content Licensing Method Involving Application Service Provider", the contents of which are incorporated herein in its entirety.

BACKGROUND

The present invention relates, in general, to methods and apparatus for licensing and managing the usage of digital content.

Although computer programs, individually also referred to as computer software products, video games, music, etc., can be sold to an end user, a more frequent approach is to license the digital product or program to an end user, with the software vendor or owner retaining ownership of all of the rights to the product.

Each license is devised to control the usage of the product or software by stating the conditions under which the product may be used, such as the location of use, the number of times used, etc. Digital products are licensed in many ways. By one category, licenses can be divided into node-locked licenses or network licenses. By another category, licenses can be divided into product licenses or product suite licenses. In general most licenses could be described by a combination or a simple variation thereof of the above two categories; i.e. node-locked product licenses, node-locked product suite licenses, network product licenses, and network product suite licenses.

Node-locked licenses restrict the use of software and digital products to a given computer. The major limitation of this approach is that it requires customers to purchase software separately for each potential user. Since each user does not use each software on his machine all the time, software purchased via this approach would idle most of the time. This is a very inefficient use of customers' money.

Network licenses allow access to the software products on computer networks formed of a number of interconnected computers or nodes which may be linked to each other and/or a central host. This addresses the primary inefficiency of node-locked licenses. Since the customer must purchase licenses only to cover the anticipated number of peak simultaneous users of that software.

Product licensing restricts the use of the license to only the product for which it is valid. In other words, the license is not transferable to other products. The limitation of this approach is that a customer must purchase the peak licenses, either node-locked or network, for each product separately. Again, peak usage for different products do not occur at the same time. Hence, the customer ends up purchasing more software licenses than really required.

Product suite licenses allow access to several software products using common licenses. A suite would generally include several individual programs which may be run concurrently with each other or individually and may or may not be linked to other programs in the suite. Traditional licensing approaches for computer programs or suites typically involve one license for all of the programs in each entire suite such that a user on a node of a computer network is charged with one license use regardless of which program the user is running from a particular program suite. A major limitation of this approach is that it assumes that each product in the suite has an equal value. Also, product suites typically involve a small number of software products which complement each other, and the expansion of suite licensing to license a wide range of software products is commercially impractical.

A recent development in licensing has been the units based licensing of multiple products. In such a system, different products are assigned different values in terms of units. A customer would license a certain number of units to run any and all of these products. While on paper, this system appears to address limitations listed above, in reality it does not due to the manner in which it is implemented by several organizations. Under this setup, when a user runs multiple products, the user is charged multiple units, also called stacking of units. Since the customers have limited budgets for purchasing software products, this system (i) forces the users to terminate one product in order to run another, thus decreasing the user's efficiency, or (ii) forces the customer to purchase additional licenses with no additional value thus undermining the profitability of their organization. This system does not encourage users to try new products, even though they are accessible and available on their network.

Other types of licensing techniques, such as a leveling license approach, enable new digital content to be used without incurring many or any additional licensed units. Either license approach can work for companies having multiple users tied together in a company based computer network.

Home computer users typically download many different types of digital content, including computer software, digital music, video games, movies, etc. While some homes can have multiple computers and multiple simultaneous users interconnected by a home based computer network, the number of users is relatively small, being on the order of two or three network connected nodes in each network at lower use or license fees.

Further, home computer users typically download the different forms of digital content from many different sources. These multiple sources make license management inoperable. In addition, the relatively small, individual users who download digital content from multiple sources are unable to take advantage of group discounts, parental monitoring and block-out, etc.

To provide a wider range of available digital content, it would be desirable to provide a club or group based approach whereby any number of unrelated individuals, either at businesses, home, etc., can form a group and act in the same manner as a company by operating under a license approach for the most economical use of a wide range of digital content made available in a selectable digital product suite.

SUMMARY

A method for accessing digital content in the form of individual software, video, music, movies, etc., is disclosed.

The method includes the steps of:

forming a suite of selectable digital content;

assigning a number of licensed units to each digital content in the suite of digital content;

forming at least one discrete customer group formed of at least two customers;

assigning an identification to each customer in the customer group to identify each customer as part of the one discrete customer group;

providing a total number of group licensed units to the one customer group; and allowing access to the suite of digital content to any of the customers in the one customer group only when a total number of available licensed units based on the difference between the total number of licensed units assigned to the one customer group and a total group checked out units for digital content in use by all of the customers of the one customer group allows access according to a license management control.

The at least one customer group may be a plurality of discrete customer groups or clubs. All of the plurality of clubs may access the same digital content suite or each club may access different digital content suites which can be individually selected by each club.

The present method of accessing digital content enables individuals which may not be normally related by a common interest, such as a business or home network, to join together to increase their buying power and accessibility to digital content by forming a discrete group of customers or users. Each club establishes its own rules and which digital content its club members may be able to access. Any digital content licensing arrangement may be selected by each club or by the product suite source for controlling access to digital content by the members of each club.

Upon termination of an execution of one digital content by a club member network, the licensed units of the terminated digital content are returned as group total for use by the club.

BRIEF DESCRIPTION OF THE DRAWINGS

The various features, advantages and other uses of the present invention will become more apparent by referring to the following detailed description and drawings in which.

DETAILED DESCRIPTION

Figure 1:
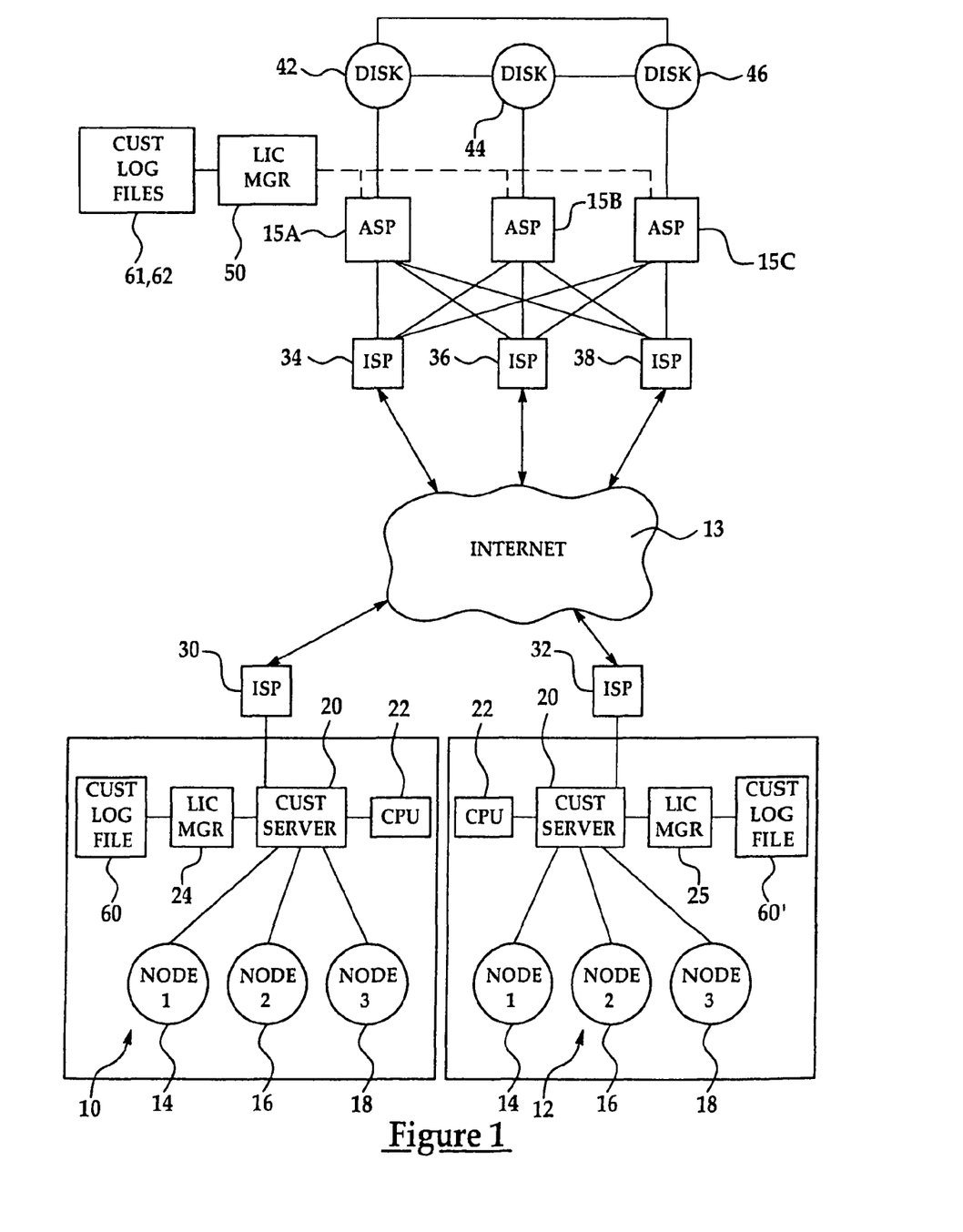
FIG. 1 is a pictorial representation of a communication network coupled to a computer server and application service provider which can use a token based club digital content licensing management method.

Referring now to the drawings and to FIG. 1 in particular, there is depicted a computer network containing at least one customer computer 10 and, preferably, a plurality of customer computers 10, 12, etc. which can independently communicate through a communications network 13, such as the Internet, with one or more remotely located networks.

By way of example only, the customer computer networks 10 and 12 each include at least one and, optionally a plurality of individual nodes, with three nodes 14, 16, and 18, being depicted by way of example only in networks 10 or 12. Each of the nodes 14, 16, and 18 is connected to a network server 20 and has its own network address so that any one of the nodes 14, 16 and 18 can communicate with the each other nodes 14, 16, and 18 within the network 10 or 12. The network server 20 is connected in data communication with a host CPU 22.

Although the individual nodes 14, 16, and 18 are depicted as being connected in a spoke configuration to the network server 20, it will be understood that this arrangement is by example only as the individual nodes 14, 16, and 18 may be connected in a ring configuration or any other configuration found in computer networks. Further, the network server 20 and the host CPU 22 may be combined into a single computer.

As will be clearly understood by those in the computer art, each of the nodes 14, 16, and 18, as well as the network server 20 and the host CPU 22, may be formed of a processing unit, hereafter CPU, such as a microprocessor, as well as input and output components coupled to the processing unit, including a memory, input components, such as a key inputs, mouse, etc., and output components, such as a screen display, printer, etc., not shown.

The processing unit and coupled I/O components maybe implemented in any electronic device, such as a desktop or laptop computer, a handheld or portable computer-like device, MP3 and other electronic media players, cellular telephones, etc.

For explanatory purposes only, a node is defined as a unique combination of a user, or a CPU or host, or a display, or a user and a CPU, or a CPU and a display, or a user and a display, or a user, a CPU and a display.

A license manager 24 is embodied in a software program which may be resident or stored in the memory of the network server 20 or the host CPU 22 and/or capable of being stored in a storage media, such as a disk, CD-ROM, etc. The license manager 24 may also be resident or stored in the memory of a separate central processing unit or microprocessor which is coupled to the network server 20 or the host CPU 22.

The function of the license manager 24, as described in greater detail hereafter, is to control access to as well as monitor the execution or running of one or more pieces of individual digital content or media coupled together or sold as a suite or even sold or licensed individually. The suite is formed of a plurality of individual digital content which may be separately executable or executable in multiple numbers, and is resident in the memory and/or a hard drive connected to the host CPU 22. In this arrangement, the network server 20 merely distributes an authorized licensed program from the suite to the requesting node.

Before defining the details of an example of a licensing method which may be employed, definitions of key terms will first be presented.

Licensed Units: The total number of units licensed by a customer on a customer computer network.

Customer Computer Network (CCN) Assigned Units: The value in terms of units assigned to each discrete digital content in the product suite licensed by one customer for execution on the customer computer network.

Customer Computer Network (CCN) Node Running Total: The total number of units checked out by one node on the customer computer network at a given time. In a leveling licensing arrangement on the customer computer network, the CCN node running total is equal to the product or digital content having the highest CCN assigned units value of all of the products or digital content executed by the one CCN node at one given time. In a stacking licensing arrangement, the CCN node running total is equal to the total of the CCN assigned units of all of the products or digital content executed by the one CCN node on the customer computer network.

Customer Computer Network (CCN) Checked Out Units: The sum of node running totals of all nodes on the customer computer network.

Total Checked Out Units: The sum of the CCN checked out units.

Available Units: Licensed units minus total checked out units.

Customer Computer Network (CCN) Required Units: Number of units required to start a new product or digital content run by one node on one customer computer network. In a leveling licensing arrangement, if the CCN assigned units for the new product or digital content are greater than the CCN node running total, the CCN required units equals the CCN assigned units of the new product minus the CCN node running total. If the CCN assigned units for the new product or digital content are less than or equal to the CCN node running total, then the CCN required units equals zero. In a stacking licensing arrangement, the CCN required units equals the number of CCN assigned units for the new product or digital content.

Customer Computer Network (CCN) Returned Units: Number of units returned to the available units when a product or digital content is terminated by one node on the customer computer network. In a leveling licensing arrangement, if the CCN assigned units of the terminated product or digital content are less than the CCN node running total, then the CCN returned units equals zero. If the CCN assigned units for the terminated product are equal to the CCN node running total, then the CCN returned units equals the CCN assigned units for the terminated product minus the next highest CCN assigned units value of the remaining products or digital content running on the node. In a stacking licensing arrangement, the CCN returned units equals the CCN assigned units of the content terminated on the customer computer network.

Each piece of digital content in a program suite licensed to a particular customer computer network, such as customer computer networks 10 and 12, is provided with two separate assigned units, such as the CCN assigned units defined above. The actual number of assigned units assigned to each discrete digital content in the program suite can be arbitrarily chosen, and the number of assigned units for two or more pieces of digital content can be identical or different.

By way of example only, the number of assigned units assigned to each piece of digital content is selected as a function of one license price of each product or program divided by an arbitrary factor. By example only, the lease price of each discrete digital content or digital product is divided by $250 to yield the number of assigned units assigned to each piece of digital content. It will also be understood that the number of assigned units assigned to each digital content may also be based on the size of the individual products, the amount of time typically employed to run each digital content, or its inherent value to an end user in a particular application.

The above described assigning of units for each piece of digital content in the program suite can be further understood by referring to U.S. patent application Ser. No. 09/553,115 filed Apr. 13, 2000, and entitled PRODUCT SUITE LICENSING METHOD, the entire contents of which are incorporated herein by reference. This prior application describes a licensing method based on a unique leveling concept for controlling the licensing of products for digital content in a product suite in a single computer network.

Thus, the licensing method requires input from the license manager 24 of the customer computer network 10 to determine the customer computer network checked out units of digital content currently being executed by the customer on the customer computer network 10 for the customer computer network 10.

Each customer computer network 10 or 12 communicates with the data communication network 13 through an Internet service provider or ISP 30, 32, respectively. In addition, the data communication network or Internet 13 in the present invention communicates with one or more ASPs through Internet service providers 34, 36 and 38, respectively. Although a single ISP 34 may be employed for communicating with one or more customer computer networks 10 and 12, for further flexibility and to insure a faster response time and an execution or run of individual digital content on the application service provider for any of the customer computer networks 10 or 12, the plurality of ISPs 34, 36 and 38 are each connectable to memory storage media, such as one or more disks 42, 44 and 46. Each can access each of the disks, 42, 44 and 46 to obtain data or digital content stored on the disks 42, 44, and 46.

Initially, the customer computer network license manager 24 recognizes the total number of licensed units purchased or made available in the customer server 20. This total number of licensed units can be paid in any of a number of ways, each primarily based on a license term or period, such as one year, for example only. The license royalty or fee will be based on a certain price per license unit, such as $250 per license unit in the above example. However, the number of licensed units purchased by this license fee covers the complete license term, such as one year, for example, and acts as a cap limiting the number of individual programs or products, as described hereafter, which can be executed or run simultaneously on the customer computer network 10. To state this another way, the total checked out units at a given time cannot exceed the number of licensed units paid for by the licensee or entity controlling the network 10.

The licensed units which are purchased by a particular customer can come in a number of different forms. In one form, all of the licensed units are treated the same and useable both on the customer computer network 10 or 12.

A customer log file 60 is maintained by the license manager 24 for the customer computer network 10 and a customer log file 60' by the license manager 25 for the customer computer network 12. The customer log file 60 or 60' contains the total number of available units which can be used at the customer computer network 10 or 12 at any given time. The license manager 24 for the customer computer network 10 will update the customer log file 60 for each change of the available units on the customer computer network 10. As described hereafter, such a change in the available units on the customer computer network 10 results from the execution of additional products from the program suite or the termination of the execution of one of the products in the suite either on the customer computer network 10 or 12.

A customer may execute any of the digital content on its local customer computer network 10 or 12 based on the determination by the license manager 24 or 25, respectively, whether the number of available units is sufficient to execute the next requested digital content on the respective customer computer network 10 or 12.

Figure 2:
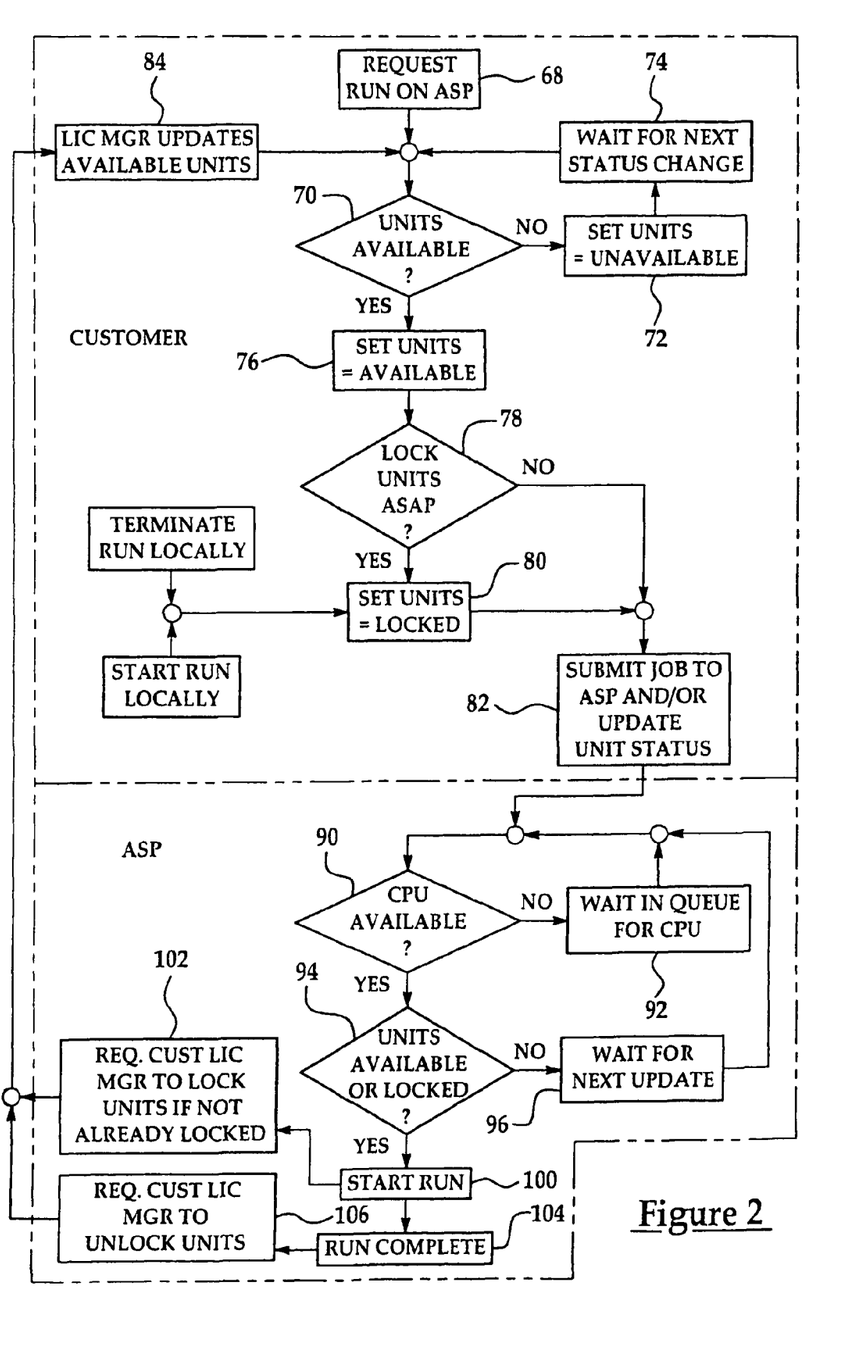
FIG. 2 is a flow diagram depicting the operation of the license management method.

However, if a sufficient number of units is available for executing the requested digital content, the license manager 24 sets a flag "units=available" in step 76 and then makes a determination in step 78 whether the user has asked to lock or not lock the units at this time. If the user has asked not to lock the units at this time, the flag remains set at "units=available", and the status is logged in step 82 for further processing. However, if the user has asked to lock the units, the license manager in step 80 sets a flag "units=locked.", and the status is logged in step 82 for further processing and asks the license manager 24 to check out the units.

The license manager in step 84 communicates the unit status logged in step 82 at regular intervals, such as every 1 minute or 15 minutes, for example, or when the status is updated in steps 72, 76 or 80 and logged in step 82.

If the status is "units=locked", the requested content will run as soon as a CPU becomes available on the ASP network. However, regardless if the status is "units=available" or "units=unavailable", the status may change depending on the activities on the customer computer network 10, 12. Hence, in addition to logging the status on to step 82, steps 72 and 78 also loop the control back to step 74 so that step 70 will be re-evaluated and the units status may be changed from "available" to "unavailable" or vice versa depending upon the change in availability of units in step 76, or a change in CPU status from available to unavailable, or a second or later queued content may be executed instead of the first queued request.

As shown in FIG. 2, the license manager 24 updates the available units in the customer log file 60 upon any of the following events:

1. Termination of a local run on the customer computer network 10;
2. The setting of "units=locked" flag in step 80;
3. The start of an execution or run of a piece of digital content on the customer computer network 10;

Thus, it can be seen that the number of available units in the customer log file 60 can be a dynamically changing number dependent upon execution of digital content on the customer computer network 10. The execution, locking or unlocking of units and the termination of execution of any piece of digital content on the customer computer network 10 causes the number of available units to increase or decrease accordingly.

If a CPU is available as determined in step 90, the license manager 50 makes a determination in step 94 if the units status is "locked", "available" or "unavailable". If the status is "unavailable", step 96 is executed wherein the license manager 50 waits for the next unit status update in steps 82 and 84 from the customer computer network 10 or the license manager 50 regarding the status of CPUs.

The license manager 50 controls and monitors all jobs queued, whether due to unavailability of a CPU or due to the unavailability of units, as follows. As and when a CPU becomes available due to termination of a job in step 104, the license manager 50 would check the first job in the queue for its units status in step 94. If units are "available" or "locked", that job will be executed as described earlier. If units were "unavailable", the job will be returned back to the queue and marked as "returned". The license manager will now check the next job in the queue for its units status. It will continue to check jobs in the queue until it finds a job with units status of "locked" or "available", or there are no more jobs left to check in the queue. The license manager 50 may also be designed such that a "returned" job would retain its original position, or it is sent to the bottom of the queue, or it is demoted by a certain number of spots in the queue. Also, if a job is flagged "returned" a certain number of times, say 3 times for example, and is waiting in the queue for a certain number of hours, say 6 hours for example, the license manager may be designed to delete the job from the queue altogether.

Figure 3:
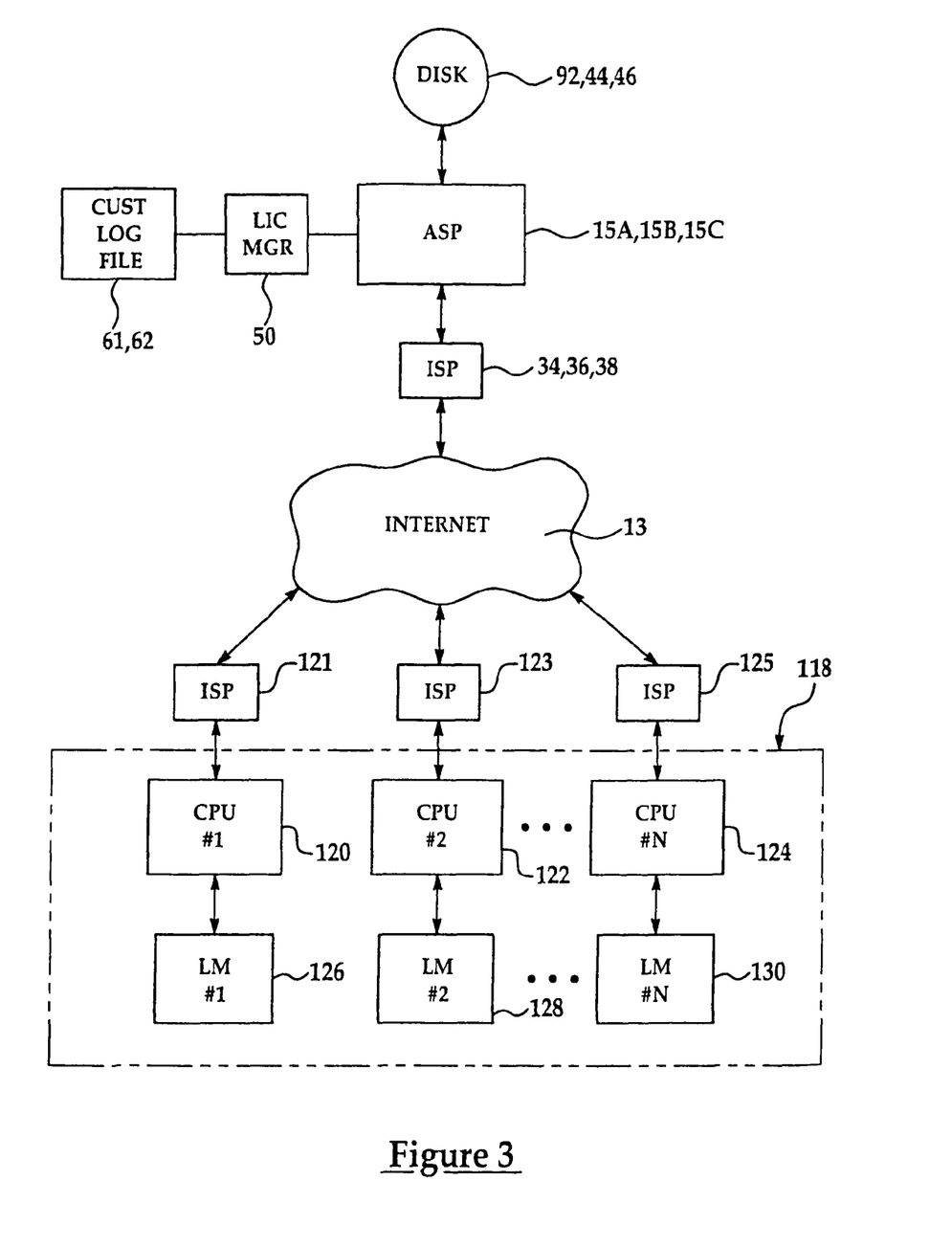
FIG. 3 is a pictorial representation of an alternate computer server and application service provider communication network using the licensing management method.

Referring now to FIG. 3, there is depicted a similar arrangement of a customer computer network denoted here by reference number 118 which communicates through a global telecommunication network, such as the Internet 13, in the same manner as described above and shown in FIGS. 1 and 2.

However, in this arrangement, the single customer computer network 118 is formed of a number of individual CPUs 120, 122 and 124, for example only. Each CPU 120, 122 and 124 has its own individual license manager 126, 128 and 130, respectively. Each CPU 120, 122 and 124 also has access through the Internet 13 via individual Internet service providers or ISPs 121, 123 and 125, respectively.

The individual CPUs 120, 122 and 124 may constitute three different users not normally affiliated with a business customer computer network. These users act independently and may be in different physical locations without any direct connection between the CPUs 120, 122 and 124. The users of the CPUs 120, 122 and 124 will initially join together as a group forming the customer computer network 118 by purchasing a total number of licensed units as a group. The individual license managers 126, 128 and 130 have access to each other via the Internet 13 to maintain a total number of individual checked out units and available units for each CPU 120, 122 and 124.

The arrangement shown in FIG. 3 enables a number of what would normally be independent CPUs to have access to an application service provider to run the latest digital content of any type, such as application programs, video games, etc., without purchasing the actual software or video game. Each individual customer is restricted by acting as a group in terms of abiding by the number of available units before being able to access and execute digital content; but typically obtains access to a larger number of units than purchased individually by the customer, and consequently to larger quantities of digital content than each customer's individually purchased units would allow.

There is further disclosed a unique token based, club licensing method for digital content.

The term "digital content" will be understood to mean any and all forms of digital content, commonly known as computer software programs, video games, music, movies, videos, etc., which can be accessed, downloaded, input, or otherwise transferred to a computer or processor and run or executed.

Thus, "digital content" includes computer software in the form of application programs, operating systems, etc., as well as digital content for audio, video, audio/video executable files. Further, the term "digital content" as used with the present licensing method further includes digital data or digital files which can be processed by other application programs or require execution by other software and/or hardware, such as a music player, etc.

The present licensing method makes use of a customer group or club. "Club" will be understood to mean any group of one or more individuals which join together to act as a single entity. The club can be a family or groups of families, for example, as well as a classroom of students, a small business, or a group of people who have met through the Internet or elsewhere and desire to be associated and act as a group for accessing digital content.

Figure 4:
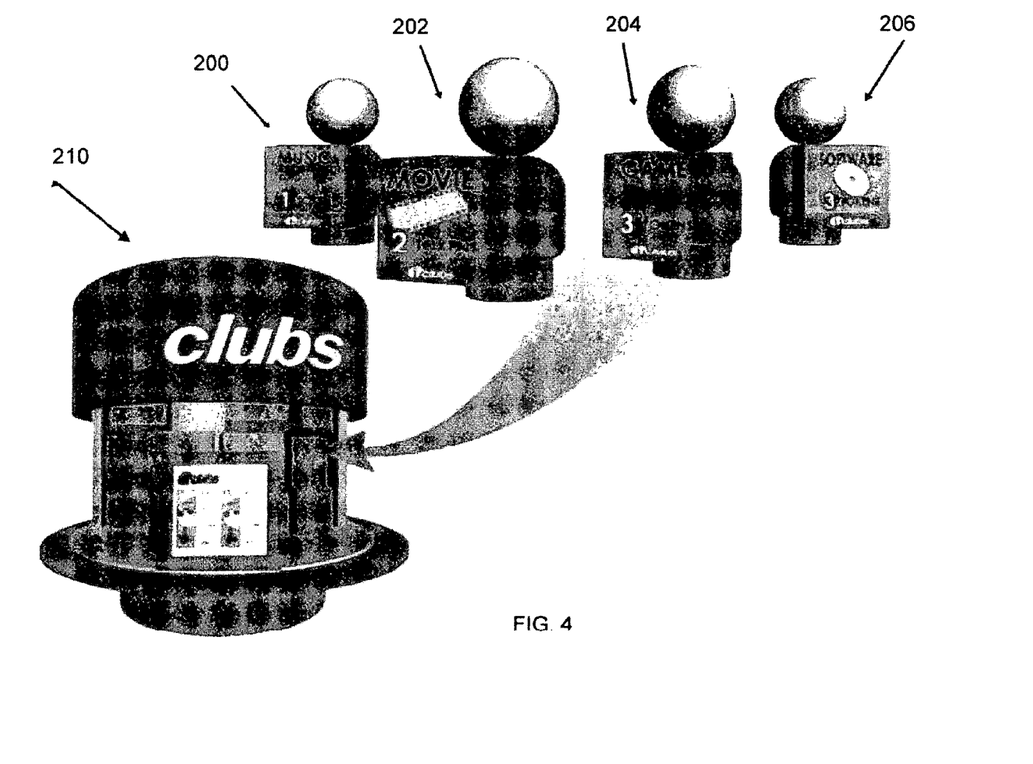
FIGS. 4-7 are pictorial representations of a token based club digital content licensing arrangement.
Figure 5:
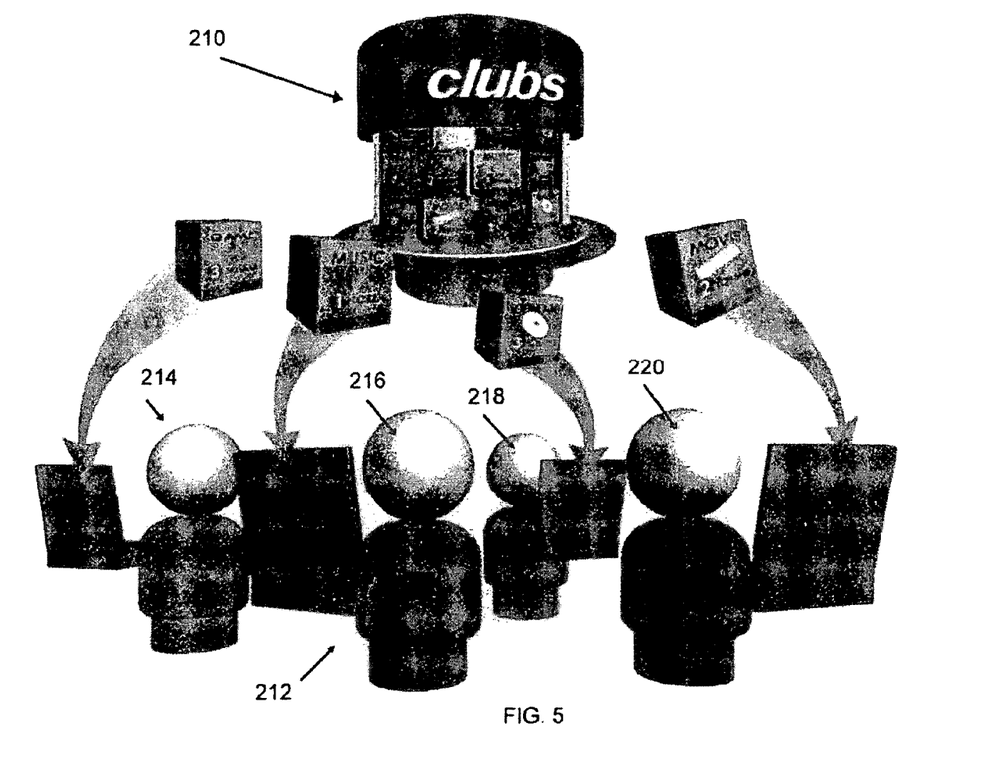

The digital content which is accessible by each group can be made available in a number of different ways. As shown in FIG. 4, one or more entities 200, 202, 204, 206, etc., such as a software company, music company, movie company, etc., may offer a list of accessible or downloadable digital content.

Alternately, an entity can accumulate a product or digital content suite of downloadable digital content, including some or all of computer software programs, movies, videos, video games, music, etc., and make them available as a source 210 to each group.

Either product or digital content suite approach requires the formation of a club 212 under club defined rules. Financial arrangements are made for billing the individual club members 214, 216, 218, 220, etc., based on any charge approach, including fees based on the amount of usage of the product suite, pro rata cost per club member 214, 216, etc.

Each club 212 will register with the product suite source, but the individual club members 214, 216, etc., do not have to be directly interconnected on the same network. Rather, each club member 214, 216, etc., may access the product suite source 210 independently of other club members. Each club member 214, etc., however, will be recognized by the product suit source 210 as belonging to a particular club 212 and the digital content pre-approved for selection by the particular club 212 will then be made available for selection by each club member 214, 216, etc.

The digital content or product suite license can be charged to the club members of each club 212 according to any licensing technique, including a stacked licensing technique wherein the number of assigned licensed units or tokens 220 are associated with each particular digital content, which can be set by the owner or originator of the digital content, are added, when the digital content is downloaded or executed by a club member, to the checked out tokens or units associated with other digital content which is being simultaneously run or executed by other of the club members 212. Each club 212 can have a maximum number of tokens 220 or total group licensed units made available to it based on the total license fees paid by each club 212. In this manner, when there are insufficient available license units or tokens 220 remaining for a club member 214, 216, etc., to access and download a particular piece of digital content, i.e., the number of available license units is less than the assigned license units for the digital content the user wishes to download that club member will not be able to access and execute the digital content until additional licensed units become available by the termination or return of an executed piece of digital content by another club member to the club product suite.

Each club member can also optionally be provided with private tokens which the club member purchases. Private tokens enable a particular club member to access digital content from the product suite on his own without regard to the available licensed units under the licensing technique employed by the club 212. If there are an insufficient number of private tokens remaining when private tokens have been employed for other currently executed or downloaded digital content, additional digital content cannot be downloaded until sufficient numbers of licensed private tokens have been returned to the product suite by the user.

The products and content that each club member 214, 216, etc., can access can be selected and preset by each club 212. For instance, parents may set up a club for their children and preselect software or other digital content that is appropriate for their children. The children are then free to make selections from within the pre-screened of digital content in the product suite. In general, a club 212 will be able to access all of the digital content in the product suite unless it places its own restrictions on its members.

The club approach enables individual club members to increase their buying power. For clubs having larger numbers of members, it is more unlikely that each club member will attempt to use club tokens 220 simultaneously. Thus, a club 212 formed of fifteen people may need to only buy enough tokens 220 for ten members to run products simultaneously.

A club 212 that frequently reaches its token limit can purchase more tokens 220. Club members thus enjoy the benefit of being able to access a large number of digital products for a single subscription fee. The digital products are maintained current by the digital content source or the product originator thereby making it unnecessary for club members to purchase a product or upgrade existing products which they have purchased.

Each club 212 can establish its own rules. The following example of the operation of a club will be understood to be by example only.

First, each club 212 picks a club name and a unique password. Each member of the club 212 then provides a login ID and personal password. A club president can be selected.

For convenience, several prepackaged club types can be made available. Choosing a club type sets up the initial operating rules and services that the club members receive. However, the preset rules and services can be customized. Examples of prepackaged club types can include a general club 212 accessing any type of digital content, a family club, a classroom club, a gamers club, music and video club, etc.

An optional club page can be provided through the digital content source to provide a menu of digital content available to the club, a convenient location for advertising and club messages, etc.

The club 212 will also set rules for adding new members, such as by invitation only, open enrollment, etc. Club voting rights can also be established by majority vote, unanimous vote, dictatorship, etc.

Each club 212 will decide the monthly fees to be paid by the club 212 from a schedule of fees established by the digital content source. Each club 212 can vote on the addition or removal of club members 214, 216, etc., the types of digital content made available to club members, mergers with other clubs, etc.

With respect to financial arrangements, each club member's credit card is billed automatically on a monthly basis for each club member's pro rata share of the monthly fee paid by the club 212. Other fee arrangements based on usage are also possible. Each club member can quit at any time or merely go "inactive" by not paying dues. Perks and incentives may also be provided by each club on an individual club basis from the digital content source. For example, bonus token give-aways can be provided by each club or each digital content source to keep club members enrolled. Bonus tokens may be provided for clubs that reach certain member sizes. Bonus tokens can also be provided to club members based on token usage over time, usage through related services, such as telephone calls, airlines, shopping, etc.

The digital content source can also provide early beta software for club members and exclusive movie, game or video releases for club members.

Figure 6:
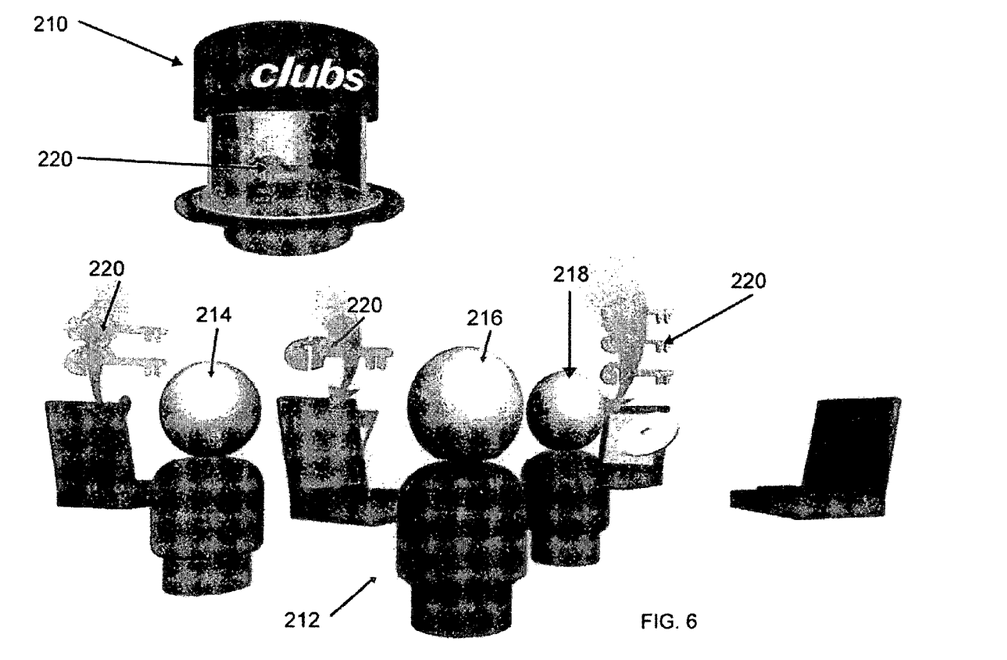

As shown in FIG. 6, a club 212 has purchased ten tokens from the source 210. The individual members 214, 216, etc., of the club 212 are then able to download and execute or run selected digital content from the digital content suite authorized by the club 212 from the source 210. For example, club member 214 is executing digital content which requires two tokens 220. Club member 216, meanwhile, is executing digital content requiring only a single token 220. Club member 218 is executing digital content which requires three tokens 220. This leaves four tokens 220 for other use by the same or other club members 214, 216, etc. Such digital content can be accessed and executed only if it requires four or less tokens 220. If the digital content or multiple pieces of digital content total more than four tokens 220, subsequent club members which access the product suite source 210 must wait until sufficient tokens 220 have been returned.

Figure 7:
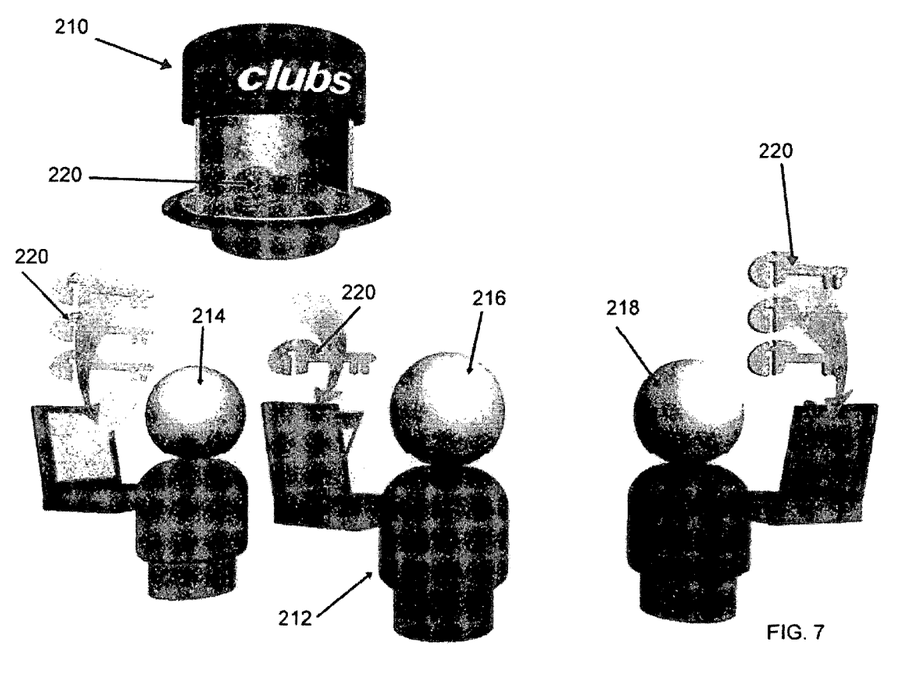

FIG. 7 shows another example in which club member 220 is executing digital content requiring three tokens 220. Club member 216 is executing digital content requiring only a single token 220. Club member 218 is executing digital content requiring three tokens. This leaves three tokens 220 in the club running total for selection by any of the members of club 212.

In summary, there has been disclosed a unique method for execution of digital content from a product suite containing licensed digital content, by preformed groups of users.

What is claimed is:

1. A method of accessing digital content comprising the steps of:
   providing a suite of selectable discrete pieces of digital content at a single host source;
   assigning a number of licensed units to each digital content in the suite of digital content;
   individual independent entities forming at least one discrete customer group, the at least one group formed of a plurality of individual customers;
   assigning an identification to each customer in the one customer group to identify each customer as part of one discrete customer group;
   selecting a group of individual digital content by each customer group from the suite of digital content for allowable access by the customers in the one customer group, respectively, from the source;
   acquiring a total number of group licensed units by the one customer group; and
   allowing access, according to a source license management control using the group licensed units, to at least one piece of digital content in the group of digital content selected by the one customer group, from the suite of digital content to at least one customer in the one customer group.

2. The method of claim 1 further comprising the step of:
   providing a distinct identification to a plurality of distinct customer groups, each group having a plurality of customers.

3. The method of claim 2 further comprising the steps of:
   allowing each of the plurality of customer groups access to the same digital content in the suite of digital content.

4. The method of claim 2 further comprising the step of:
   allowing each of the plurality of customer groups access to different digital content in the suite of digital content.

5. The method of claim 1 wherein the step of acquiring a total number of group licensed units by the one customer group comprises the step of:
   purchasing the total number of group licensed units by the one customer group.

6. The method of claim 1 further comprising the step of:
   purchasing private license units by at least one customer in the one customer group useable only by the one customer.

7. The method of claim 6 wherein the step of allowing access to the suite of digital content further comprises the step of:
   allowing access to the suite of digital content through the use of the private-license units by the one customer independent of group licensed units.

8. The method of claim 1 further comprising the step of:
   establishing by the at least one customer group membership rules pertaining to access by each customer of the customer group to the licensed suite of digital content.

9. The method of claim 5 further comprising the step of:
   requiring periodic monetary payments by each customer of the at least one customer group for each customer to maintain membership in the at least one customer group.

10. The method of claim 1 wherein the step of allowing access further comprises the step of:
    providing a license management control within each distinct customer group;
    allowing access, subject to the source license management control, by the group license management control by all customers in the one discrete group.

* * * * *